United States Patent [19]

Sasaki et al.

[11] Patent Number: 4,587,226
[45] Date of Patent: May 6, 1986

[54] PROCESS FOR PRODUCING ANTIMONY-CONTAINING OXIDE CATALYST WITH IMPROVED STRENGTH

[75] Inventors: Yutaka Sasaki; Toshio Nakamura; Hiroshi Yamamoto; Hiroshi Murata; Yoshimi Nakamura; Naohiro Takahashi, all of Kanagawa, Japan

[73] Assignee: Niito Chemical Industry Co., Ltd., Tokyo, Japan

[21] Appl. No.: 699,056

[22] Filed: Feb. 7, 1985

[30] Foreign Application Priority Data

Feb. 7, 1984 [JP] Japan ................................ 59-19368

[51] Int. Cl.$^4$ .............................................. B01J 37/34
[52] U.S. Cl. ...................................... 502/5; 502/249; 502/522
[58] Field of Search ........................... 502/5, 249, 522

[56] References Cited

U.S. PATENT DOCUMENTS

| 2,457,091 | 12/1948 | Schlesman | 502/5 |
| 2,484,284 | 10/1949 | Glassbrook et al. | 502/5 |
| 2,517,140 | 8/1950 | Smith | 502/5 X |
| 2,968,652 | 1/1961 | Mertes | 502/5 X |
| 3,686,138 | 8/1972 | Yoshino et al. | 502/249 |
| 3,960,772 | 6/1976 | Fort et al. | 502/5 |

FOREIGN PATENT DOCUMENTS

| 836702 | 6/1960 | United Kingdom | 502/5 |
| 1530445 | 11/1978 | United Kingdom | 502/5 |

Primary Examiner—Carl F. Dees
Attorney, Agent, or Firm—Sughrue, Mion, Zinn, Macpeak and Seas

[57] ABSTRACT

A process for producing an antimony-containing oxide catalyst with improved strength is described, by the steps of preparing a slurry containing an antimony compound, a polyvalent metal compound and a silica sol as the essential ingredients, adjusting the pH of the slurry to 7 or less, heat treating the slurry at a temperature of 40° C. or higher, and thereafter drying the slurry and calcining the dried particles, wherein said slurry is irradiated with ultrasonic waves during the pH adjustment, or after the pH adjustment and before completion of the heat treatment.

5 Claims, No Drawings

PROCESS FOR PRODUCING ANTIMONY-CONTAINING OXIDE CATALYST WITH IMPROVED STRENGTH

BACKGROUND OF THE INVENTION

The present invention relates to an improved process for producing an antimony-containing oxide catalyst. More particularly, the invention relates to a process for producing a catalyst for use in the oxidation, ammoxidation or oxidative dehydrogenation of organic compounds.

Many catalysts are known for use in the oxidation, ammoxidation or oxidative dehydrogenation of organic compounds. Particularly good results are obtained by antimony-containing catalysts such as the antimony-tin oxide composition described in U.S. Pat. No. 3,152,170, the oxide composition containing antimony and iron, cobalt and/or nickel oxides described in Japanese Patent Publication No. 19111/63, and the antimonyuranium oxide composition described in U.S. Pat. No. 3,308,151.

On the other hand, it is difficult to produce antimony-containing oxide catalysts of high strength. Several proposals have been made for improving the strength of antimony-containing oxide catalysts. For example, U.S. Pat. Nos. 3,341,471, 3,657,155 and 3,686,138 describe processes for producing antimony-containing oxide catalysts with improved strength.

However, the prior art techniques are not completely satisfactory for the purpose of producing catalysts having high activity and good physical properties. It is important to use catalysts having high activity and strength. Catalysts having high activity are not suitable for industrial use if their strength is low. In such fluidized bed reactions, the catalyst loss is undesirably large (due to scattering to the outside of the system) and it becomes difficult to operate the system in a steady manner. Even if this worst case does not occur, the consumption of the catalyst is increased so as to undesirably increase the manufacturing cost of the end product.

SUMMARY OF THE INVENTION

The present invention overcomes the defects of the prior art techniques mentioned above, and provides an improved process for producing a highly active and strong antimony-containing oxide catalyst. The method of the present invention is particularly effective in producing an antimony-containing oxide catalyst supported on silica for use in fluidized bed reactions.

More particularly, the present invention provides an improved process for producing an antimony-containing oxide catalyst with improved strength by the steps of preparing a slurry containing an antimony compound, a polyvalent metal compound and a silica sol as the essential ingredients, adjusting the pH of the slurry to 7 or less, heat treating the slurry at a temperature of 40° C. or higher, and thereafter drying the slurry and calcining the dried particles wherein the improvement comprises that said slurry is irradiated with ultrasonic waves during the pH adjustment, or after the pH adjustment and before completion of the heat treatment.

A preferred catalyst according to this invention has a composition represented by the empirical formula

$$Me_a Se_b X_c Q_d R_e O_f (SiO_2)_g$$

wherein
Me represents at least one element selected from the group consisting of Fe, Co, Ni, Sn, U, Cr, Cu, Mn, Ti, Th, and Ce;
X represents at least one element selected from the group consisting of V, Mo, and W;
Q represents at least one element selected from the group consisting of Li, Na, K, Rb, Cs, Be, Mg, Ca, Sr, Ba, Y, La, Th, Zr, Hf, Nb, Ta, Re, Ru, Os, Rh, Ir, Pd, Pt, Ag, Zn, Cd, Al, Ga, In, Tl, Ge, Pb, As, and Se, and preferably at least one element selected from the group consisting of Mg, Ca, Zr, Nb, Ta, An, Al, Ga, and Pb;
R represents at least one element selected from the group consisting of B, P, Te, and Bi; and
the subscripts a, b, c, d, e, f and g represent atomic ratios and are respectively within the ranges
a is from 5 to 15;
b is from 5 to 100 (preferably from 10 to 60);
c is from 0 to 15 (preferably from 0.1 to 10);
d is from 0 to 20 (preferably from 0.1 to 10);
e is from 0 to 10 (preferably from 0.05 to 5);
g is from 10 to 200 (preferably from 20 to 100); and
f refers to a number of oxygen atoms corresponding to the oxide as formed by bonding the respective constituent elements.

The shape of the catalyst to be prepared in the present invention depends on whether it is used for reaction in a fixed bed or a fluidized bed. For reaction in a fixed bed, catalysts of various shapes may be used, such as pellets and spherical balls of a size of about several millimeters. For reaction in a fluidized bed, substantially spherical catalyst particles having an average diameter in the range of from 5 to 200 μm are used.

Illustrative antimony compounds that may be used in the present invention include metallic antimony as oxidized with nitric acid, antimony nitrate, basic antimony nitrate, antimony trioxide, antimony tetroxide, antimony pentoxide, antimonic acid, polyantimonic acid, antimony trichloride, antimony pentachloride, antimony trichloride as oxidized with nitric acid, antimony trioxide as oxidized with hydrogen peroxide, and antimony pentoxide sol.

The polyvalent metal compound used in the present invention is a compound of an element having divalence of higher valencies and it is a compound of at least one element selected from among the constituent elements of the catalyst. This compound may be an oxide, a hydroxide, or a nitrate of the element defined above.

The material used for any other catalyst component may be selected from among the oxide, hydroxide and nitrate of the respective constituent elements.

Silica sol is conveniently selected from among the commercially available products. It may be synthesized by any of the known methods such as ion exchange, gel peptization, dialysis and ultrafiltration.

The process of the present invention proceeds as follows: an aqueous slurry containing an antimony compound, a polyvalent metal compound, a silica sol and materials for optional catalyst components is prepared; under irradiation with ultrasonic waves, the pH of the slurry is adjusted to 7 or less, preferably 4 or less; alternatively, the slurry is irradiated with ultrasonic waves after pH adjustment to 7 or less, preferably 4 or less, and before completion of the heat treatment of the slurry. The ultrasonic irradiation period may range from about 30 seconds to about 1 hour. The timing of the application of ultrasonic waves is critical; little improvement in catalyst strength is achieved if ultrasonic waves are applied to a slurry which is a simple mixture of the ingredients and which has yet to be adjusted to a pH of 7 or less. It is also practically ineffectual to apply ultrasonic waves to a slurry that has been subjected to heat treatment.

The slurry treated with ultrasonic waves is subsequently given a heat treatment at a temperature in the range of from about 40° C. to about 150° C., and preferably between about 80° C. and about 120° C., for a period of at least 20 minutes, and preferably between 30 minutes and 10 hours, while maintaining the slurry state.

In a preferred method for producing a catalyst containing antimony and iron, a slurry containing a trivalent antimony compound, an iron compound, nitrate ions, and a silica sol is first prepared, and is subsequently subjected to the treatments described above, including the application of ultrasonic waves. In this case, gas evolution accompanies the oxidation of the tirvalent antimony to pentavelent antimony during heat treatment, and the effectiveness of ultrasonic application is not exhibited unless it is performed before the completion of this gas evolution.

The slurry thus treated is subsequently dried. In the case of producing a catalyst for use in a fluidized bed reaction, the slurry is spray-dried to obtain fine spherical particles, which are then calcined (preferably after calcination at 200°-600° C.) at a temperature between about 400° and 950° C. for a period of 30 minutes to 50 hours, thereby obtaining the end catalyst. In the case of producing a catalyst for use in a fixed bed reaction, the slurry may be shaped during any of the steps following drying.

The slurry obtained after the pH adjustment, but before the heat treatment, must contain the antimony compound, polyvalent metal compound and silica sols simultaneously. Part of each component may be added after the heat treatment, but a catalyst having appropriate physical properties cannot be obtained if the whole part of any one of the three components is added after the heat treatment.

While various modifications may be made to the process of the present invention, the important thing is that treatment with ultrasonic waves is applied to a slurry during pH adjustment, or after pH adjustment and before completion of the heat treatment. Ultrasonic application may be direct using an oscillator submerged within a slurry, or indirect by external irradiation of a slurry containing vessel. Many other methods may also be employed. A commercial ultrasonic homogenizer may be advantageously used for the purpose of the present invention.

Various types of oscillators that cover a wide frequency range are commercially available and a suitable type may be selected depending upon the specific need. A preferred frequency range of ultrasonic waves to be used in the present invention is from 10 to 100 kHz, with the range of 15-50 kHz being more preferred.

The antimony-containing oxide catalyst thus prepared has a particularly high strength and is suitable for industrial use.

The advantages of the present invention are hereunder described in greater detail by reference to the following working examples and comparative examples.

Two tests were conducted to check the strength of the fluidized bed catalyst samples prepared in the examples.

(1) Attrition Resistance Test

The method described in "Test Methods for Synthetic Cracking Catalysts" (American Cyanamid Co., Ltd., 6/31-4m-1/57), which is known as as collection of testing methods for catalysts used in fluidized catalytic cracking, was used. The attrition loss (%) was determined by the following formula:

Attrition loss (%) $R = [B/(C-A)] \times 100$ wherein
A = the weight (g) of the catalyst portion that wore away in the period of 0-5 hrs;
B = the weight (g) of the catalyst portion that wore away in the period of 5-20 hrs;
C = the weight (g) of the catalyst tested.

For the purpose of the experimental testing, C was selected at 50. The higher the attrition resistance, the smaller the R value (%) the catalyst showed.

(2) Crushing Strength Test

A catalyst was screened through a micromesh sieve to obtain a test sample having particle sizes between 35 and 40 μm. A portion (0.025 g) of this sample was put into a 4 cc polystyrene cylindrical vessel together with steel balls (2 mmφ). The sample was pulverized by a 90 sec treatment in a mixer mill (manufactured by SPEX Industries, Inc.). A particle size distribution profile was measured for the crushed sample, and the K value (%) representing the proportion of the amount of particles with a size of 16 μm or less relative to the amount of the sample initially charged was determined. The larger the strength of the catalyst, the smaller is the K value shown.

The activity of each catalyst sample was determined by performing ammoxidation of propylene in the following manner:

A fluidized bed reactor having a fluidized bed zone with an inside diameter of 2.5 cm and a height of 40 cm was charged with the catalyst and fed with a gas of the following composition in order to perform ammoxidation at atmospheric pressure:
$O_2$ (as air)/propylene = 2.2 (mol/mol)
$NH_3$/propylene = 1.1 (mol/mol)

EXAMPLE 1

A catalyst having the empirical formula 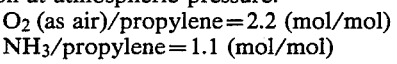 $W_{0.25}Mo_{0.5}Te_{1.5}Cu_4Fe_{11}Sb_{25}O_{75.75}(SiO_2)_{50}$ was prepared by the following procedure.

Electrolytic iron powder (73.0 g) was provided. Nitric acid (590 ml, specific gravity: 1.38) was mixed with pure water (740 ml) and the mixture was heated. To the heated mixture, the electrolytic iron powder was added in small portions. It was confirmed that a complete solution had formed.

Metallic tellurium powder (22.7 g) was dissolved in the solution.

Copper nitrate (115 g) was dissolved in the solution of iron nitrate. To the resulting solution of iron-tellurium-copper nitrate, 1,785 g of silica sol was added. Antimony trioxide (433 g) was added to the resulting silica sol solution obtain a slurry.

Ammonium paratungstate (7.8 g) and ammonium paramolybdate (10.5 g) were dissolved in pure water (500 ml), and the resulting solution was added to the previously prepared slurry.

Under application of ultrasonic waves, 15% ammonia water was added to the slurry in small amounts until it had a pH of 2. The application of ultrasonic waves was indirect, using an ultrasonic cleaner (product of Branson Ultrasonic Corp.). The frequency of the ultrasonic waves used was 45 kHz and the irradiation period was about 60 minutes.

After the pH adjustment, the application of ultrasonic waves was suspended, and the slurry was heated at 100° C. under reflux for 4 hours.

After the heat treatment, the slurry was spray-dried under thorough agitation. Spherical particles were obtained by spray-drying, and then they were calcined in three stages, first at 200° C. for 4 hours, then at 400° C. for 4 hours and finally at 785° C. for 3 hours.

EXAMPLE 2

A catalyst was prepared as in Example 1 except that a slurry that was pH adjusted but which had yet to be heat treated was irradiated with ultrasonic waves for about 10 minutes.

EXAMPLE 3

A catalyst was prepared as in Example 1 except that a slurry just after mixing all the ingredients was treated with ultrasonic waves for about 30 minutes until the pH adjustment was completed. After heat treating the slurry, another application of ultrasonic waves was effected for 20 minutes. In each ultrasonic application, the frequency was 45 kHz.

EXAMPLE 4

A catalyst having the empirical formula $Mo_{0.5}Te_{1.5}Cu_{4.5}Fe_{11}Sb_{25}O_{75.5}(SiO_2)_{50}$ was prepared by the following procedure.

Electrolytic iron powder (73.2 g) was provided. Nitric acid (560 ml, specific gravity: 1.38) was mixed with pure water (710 ml) and the mixture was heated. To the heated mixture, the electrolytic iron powder was added in small portions. It was confirmed that a complete solution had formed.

Copper nitrate (129 g) was dissolved in the solution of iron nitrate. To the resulting solution of iron-copper nitrate, 1,789 g of silica sol was added. Antimony trioxide (434 g) was added to the resulting silica sol solution to obtain a slurry.

Telluric acid (41.0 g) and ammonium paramolybdate (10.5 g) were dissolved in pure water (300 ml), and the resulting solution was added to the previously prepared slurry.

The thus prepared slurry was circulated through an ultrasonic homogenizer (Model UH-8 of Choonpa Kogyo K.K.) while 15% ammonia water was added dropwise until the slurry had a pH of 2. The frequency of the ultrasonic waves used was 19 kHz.

After the pH adjustment, the application of ultrasonic waves was suspended, and the slurry was heated at 100° C. under reflux for 3 hours. The duration of ultrasonic treatment during the pH adjustment was about 20 minutes.

After completion of the heat treatment, the slurry was spray dried under thorough agitation. Spherical particles were obtained by spray drying, and then they were calcined in three stages, first at 200° C. for 4 hours, then at 400° C. for 4 hours and finally at 790° C. for 3 hours.

EXAMPLE 5

A catalyst having the empirical formula $Fe_{10}Co_{1.5}Ni_{1.5}Sb_{25}W_{0.5}Te_{1.2}B_{0.5}O_{72.7}(SiO_2)_{50}$ was prepared as in Example 1 except that Co and Ni were added as nitrate salts, and boric acid anhydride was added as the B source. Ultrasonic application was conducted for about 20 minutes following pH adjustment and preceding heat treatment. The final calcination of the spherical particles consisted of heating at 815° C. for 3 hours.

EXAMPLE 6

A catalyst having the empirical formula $Fe_{10}Sn_{0.5}U_1Sb_{25}W_{0.3}Mo_{0.3}Zr_{0.2}Ga_{0.2}Te_{1.0}Bi_{0.5}O_{74.2}(SiO_2)_{30}$ was prepared as in Example 1, except that the Sn source was metallic tin as oxidized with nitric acid, and the U, W, Zr, Ga, Te and Bi sources were respectively uranyl nitrate, ammonium paratungstate, zirconium oxynitrate, gallium nitrate, telluric acid, and bismuth nitrate. Ultrasonic application was conducted for about 60 minutes following pH adjustment and preceding heat treatment. The final stage of calcination consisted of heating at 790° C. for 4 hours.

EXAMPLE 7

A catalyst having the empirical formula $Fe_{10}Cr_1Sb_{20}W_{0.5}Nb_{0.2}Ta_{0.2}P_{0.5}O_{59.5}(SiO_2)_{60}$ was prepared as in Example 1 except that the Cr, Nb, Ta and P sources were chromium nitrate, niobium oxalate, tantalum pentoxide, and phosphoric acid, respectively. Ultrasonic application was conducted for about 15 minutes following pH adjustment and preceding the heat treatment. The final stage of calcination consisted of heating at 850° C. for 3 hours.

EXAMPLE 8

A catalyst having the empirical formula $Fe_{10}Mn_2Sb_{30}Mo_{0.5}Zn_{0.5}Bi_{0.5}P_{0.5}O_{83}(SiO_2)_{70}$ was prepared as in Example 1, except that Mn, Zn and Bi were used as nitrate salts, whereas the P source was phosphoric acid. Ultrasonic application was conducted for about 10 minutes following pH adjustment and preceding the heat treatment. The final stage of calcination consisted of heating at 820° C. for 5 hours.

EXAMPLE 9

A catalyst having the empirical formula $Fe_8Ti_2Sb_{20}V_{0.3}Al_1Te_{1.1}O_{60.5}(SiO_2)_{55}$ was prepared as in Example 1, except that the Ti, V and Te sources were titanium dioxide, ammonium metavanadate and tellurium dioxide, whereas Al was used as a nitrate salt. Ultrasonic application was conducted for about 10 minutes following pH adjustment and preceding heat treatment. The final stage of calcination consisted of heating at 800° C. for 4 hours.

EXAMPLE 10

A catalyst having the empirical formula $Fe_{10}Cu_3Ni_{0.5}Sb_{35}W_{0.5}Mo_{0.2}Pb_{0.5}Te_{1.5}O_{155.1}(SiO_2)_{60}$ was prepared as in Example 1, except that Ni and Pb were used as nitrate salts and the Te source was telluric acid. Ultrasonic application was conducted for about 120 minutes following pH adjustment and preceding heat treatment. The final stage of calcination consisted of heating at 770° C. for 3 hours.

COMPARATIVE EXAMPLE 1

A catalyst was prepared as in Example 1 except that no ultrasonic application was conducted at the time of pH adjustment.

COMPARATIVE EXAMPLE 2

A catalyst was prepared as in Example 1 except that no ultrasonic application was conducted at the time of pH adjustment, and instead, the slurry containing all the ingredients before pH adjustment was irradiated with ultrasonic waves.

COMPARATIVE EXAMPLE 3

A catalyst was prepared as in Example 1 except that no ultrasonic application was conducted at the time of pH adjustment, and instead, the slurry after completion of the heat treatment was irradiated with ultrasonic waves.

COMPARATIVE EXAMPLE 4

A catalyst was prepared as in Example 4, except that no ultrasonic application was conducted at all.

COMPARATIVE EXAMPLE 5

A catalyst having the empirical formula $Fe_{10}Co_{1.5}Ni_{1.5}Sb_{25}W_{0.5}Te_{1.2}B_{0.5}O_{72.7}(SiO_2)_{50}$ was prepared as in Example 5, except that no ultrasonic application was conducted.

COMPARATIVE EXAMPLE 6

A catalyst having the empirical formula $Fe_{10}Sn_{0.5}U_1Sb_{25}W_{0.3}Mo_{0.3}Zr_{0.2}Ga_{0.2}Te_{1.0}Bi_{0.5}O_{74.2}(SiO_2)_{30}$ was prepared as in Example 6, except that no ultrasonic application was conducted.

COMPARATIVE EXAMPLE 7

A catalyst having the empirical formula $Fe_{10}Cr_1Sb_{20}W_{0.5}Nb_{0.2}Ta_{0.2}P_{0.5}O_{59.5}(SiO_2)_{60}$ was prepared as in Example 7, except that no ultrasonic application was conducted.

COMPARATIVE EXAMPLE 8

A catalyst having the empirical formula $Fe_{10}Mn_2Sb_{30}Mo_{0.5}Zn_{0.5}Bi_{0.5}P_{0.5}O_{83}(SiO_2)_{70}$ was prepared as in Example 8, except that no ultrasonic application was conducted.

COMPARATIVE EXAMPLE 9

A catalyst having the empirical formula $Fe_8Ti_2Sb_{20}V_{0.3}Al_1Te_{1.1}O_{60.5}(SiO_2)_{55}$ was prepared as in Example 9, except that no ultrasonic application was conducted.

COMPARATIVE EXAMPLE 10

A catalyst having the empirical formula $Fe_{10}Cu_3Ni_{0.5}Sb_{35}W_{0.5}Mo_{0.2}Pb_{0.5}Te_{1.5}O_{155.1}(SiO_2)_{60}$ was prepared as in Example 10, except that no ultrasonic application was conducted.

The physical properties of the catalysts prepared in the Examples and Comparative Examples are shown in Table 1, and the results of activity tests conducted with these catalysts are listed in Table 2.

TABLE 1

| Example No. | Catalyst Composition (atomic ratio) | Final Calcination Temperature (°C.) | Catalyst Strength Attrition Resistance R Value | Catalyst Strength Crushing Strength K Value |
|---|---|---|---|---|
| Example 1 | $W_{0.25}Mo_{0.5}Te_{1.5}Cu_4Fe_{11}Sb_{25}O_{75.75}(SiO_2)_{50}$ | 785 | 0.5 | 20.1 |
| Example 2 | " | 785 | 0.3 | 22.1 |
| Example 3 | " | 785 | 0.4 | 19.3 |
| Example 4 | $Mo_{0.5}Te_{1.5}Cu_{4.5}Fe_{11}Sb_{25}O_{75.5}(SiO_2)_{50}$ | 790 | 0.2 | 20.0 |
| Example 5 | $Fe_{10}Co_{1.5}Ni_{1.5}Sb_{25}W_{0.5}Te_{1.2}B_{0.5}O_{72.7}(SiO_2)_{50}$ | 815 | 1.1 | 22.5 |
| Example 6 | $Fe_{10}Sn_{0.5}U_1Sb_{25}W_{0.3}Mo_{0.3}Zr_{0.2}Ga_{0.2}Te_{1.0}Bi_{0.5}O_{74.2}(SiO_2)_{30}$ | 790 | 1.8 | 28.6 |
| Example 7 | $Fe_{10}Cr_1Sb_{20}W_{0.5}Nb_{0.2}Ta_{0.2}P_{0.5}O_{59.5}(SiO_2)_{60}$ | 850 | 0.9 | 15.2 |
| Example 8 | $Fe_{10}Mn_2Sb_{30}Mo_{0.5}Zn_{0.5}Bi_{0.5}F_{0.5}O_{83}(SiO_2)_{70}$ | 820 | 2.0 | 39.4 |
| Example 9 | $Fe_8Ti_2Sb_{20}V_{0.3}Al_1Te_{1.1}O_{60.5}(SiO_2)_{55}$ | 800 | 1.9 | 26.8 |
| Example 10 | $Fe_{10}Cu_3Ni_{0.5}Sb_{35}W_{0.5}Mo_{0.2}Pb_{0.5}Te_{1.5}O_{155.1}(SiO_2)_{60}$ | 770 | 2.3 | 39.9 |
| Comparative Example 1 | Same as in Example 1 | 785 | 0.5 | 35.8 |
| Comparative Example 2 | " | 785 | 0.6 | 38.1 |
| Comparative Example 3 | " | 785 | 0.7 | 40.1 |
| Comparative Example 4 | Same as in Example 4 | 790 | 0.5 | 35.9 |
| Comparative Example 5 | Same as in Example 5 | 815 | 1.5 | 38.2 |
| Comparative Example 6 | Same as in Example 6 | 790 | 2.1 | 40.5 |
| Comparative Example 7 | Same as in Example 7 | 850 | 1.1 | 22.0 |
| Comparative Example 8 | Same as in Example 8 | 820 | 2.2 | 49.6 |
| Comparative Example 9 | Same as in Example 9 | 800 | 2.3 | 30.8 |
| Comparative Example 10 | Same as in Example 10 | 770 | 3.3 | 51.7 |

TABLE 2

| Example No. | Reaction Temperature (°C.) | Contact Time (sec) | Acrylonitrile Yield (%) | Total Propylene Conversion (%) |
|---|---|---|---|---|
| Example 3 | 435 | 3.5 | 82.9 | 97.8 |
| Example 4 | 435 | 3.5 | 83.3 | 98.8 |
| Example 5 | 425 | 4.0 | 80.3 | 97.9 |
| Example 6 | 425 | 4.0 | 78.9 | 97.5 |
| Example 7 | 430 | 4.5 | 72.1 | 95.6 |
| Example 8 | 425 | 4.5 | 73.0 | 96.8 |
| Example 9 | 430 | 4.0 | 77.8 | 98.0 |
| Example 10 | 430 | 3.5 | 81.4 | 98.9 |
| Comparative Example 1 | 435 | 3.5 | 82.2 | 97.5 |
| Comparative Example 4 | 435 | 3.5 | 82.6 | 98.1 |
| Comparative Example 5 | 425 | 4.0 | 80.0 | 97.9 |
| Comparative Example 6 | 425 | 4.0 | 78.8 | 97.3 |
| Comparative Example 7 | 430 | 4.5 | 70.9 | 95.0 |
| Comparative Example 8 | 425 | 4.5 | 73.1 | 95.5 |
| Comparative Example 9 | 430 | 4.0 | 77.9 | 98.4 |
| Comparative Example 10 | 430 | 3.5 | 80.9 | 98.7 |

What is claimed is:

1. In a process for producing an antimony-containing oxide catalyst with improved strength by the steps of preparing a slurry containing an antimony compound, a polyvalent metal compound and a silica sol as the essential ingredients, adjusting the pH of the slurry to 7 or less, heat treating the slurry at a temperature of 40° C. or higher, and thereafter drying the slurry and calcining the dried particles, the improvement wherein said slurry is irradiated with ultrasonic waves during the pH adjustment, or after the pH adjustment and before completion of the heat treatment wherein the drying of the slurry is performed by spray drying so as to form fine spherical particles, which are subsequently calcined at 200°–600° C., and finally calcined at 400°–950° C., the polyvalent metal compound is a compound of at least one element selected from the group consisting of iron, cobalt, nickel, tin, uranium, chromium, copper, manganese, titanium, vanadium, molybdenum, tungsten, tellurium, bismuth, arsenic, thorium, and cerium, and the slurry is irradiated with ultrasonic waves having a frequency range of from 10 to 100 kHz.

2. A process according to claim 1, wherein said slurry contains a trivalent antimony compound, an iron compound, nitrate ions, and a silica sol as the essential ingredients, and said slurry is irradiated with ultrasonic waves during pH adjustment, or after the pH adjustment and before the completion of gas evolution that accompanies oxidation of the trivalent antimony to pentavalent antimony during the heat treatment of the slurry.

3. A process according to claim 1, wherein the catalyst has the composition represented by the empirical formula $$Me_aSb_bX_cQ_dR_eO_f(SiO_2)_g$$

wherein

Me represents at least one element selected from the group consisting of Fe, Co, Ni, Sn, U, Cr, Cu, Mn, Ti, Th, and Ce;

X represents at least one element selected from the group consisting of V, Mo, and W;

Q represents at least one element selected from the group consisting of Li, Na, K, Rb, Cs, Be, Mg, Ca, Sr, Ba, Y, La, Th, Zr, Hf, Nb, Ta, Re, Ru, Os, Rh, Ir, Pd, Pt, Ag, Zn, Cd, Al, Ga, In, Tl, Ge, Pb, As, and Se;

R represents at least one element selected from the group consisting of B, P, Te, and Bi;

the subscripts of a, b, c, d, e, f and g represent atomic ratios and are respectively within the ranges a is from 5 to 15;
b is from 5 to 100;
c is from 0 to 15;
d is from 0 to 20;
e is from 0 to 10;
g is from 10 to 200; and
f refers to the number of oxygen atoms corresponding to an oxide as formed by bonding the respective constituent elements.

4. A process according to claim 1, wherein the ultrasonic application is either indirect by external irradiation of a slurry-containing vessel or direct using an oscillator submerged in the slurry.

5. A process according to claim 4, wherein the ultrasonic application is conducted by an ultrasonic homogenizer.

* * * * *